US007522097B2

(12) United States Patent
Wakeman

(10) Patent No.: US 7,522,097 B2
(45) Date of Patent: Apr. 21, 2009

(54) RADAR PLATFORM ANGULAR MOTION COMPENSATION

(75) Inventor: David R. Wakeman, Irvine, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/164,873

(22) Filed: Dec. 8, 2005

(65) Prior Publication Data

US 2007/0132634 A1  Jun. 14, 2007

(51) Int. Cl.
G01S 7/40 (2006.01)
G01S 7/28 (2006.01)
G01S 7/282 (2006.01)
G01S 7/285 (2006.01)
G01S 13/00 (2006.01)
G01S 7/00 (2006.01)

(52) U.S. Cl. .......................... 342/174; 342/13; 342/14; 342/147; 342/149; 342/157; 342/165; 342/173; 342/175; 342/195; 342/196; 342/368; 342/377

(58) Field of Classification Search ...... 342/25 R–25 F, 342/89–103, 147, 149–154, 165–175, 190–197, 342/368–384, 13–20, 73–81, 156–158
See application file for complete search history.

(56) References Cited

U.S. PATENT DOCUMENTS

| | | | | |
|---|---|---|---|---|
| 4,093,951 A | * | 6/1978 | ap Rhys | 342/149 |
| 4,121,209 A | * | 10/1978 | ap Rhys | 342/368 |
| 4,134,113 A | * | 1/1979 | Powell | 342/25 C |
| 4,924,229 A | * | 5/1990 | Eichel et al. | 342/25 E |
| 4,942,403 A | | 7/1990 | Yokoyama | 342/372 |
| 5,021,789 A | * | 6/1991 | Shaw | 342/25 E |
| 5,043,734 A | * | 8/1991 | Niho | 342/25 A |
| 5,248,976 A | * | 9/1993 | Niho et al. | 342/25 A |
| 5,610,610 A | * | 3/1997 | Hudson et al. | 342/25 F |
| 5,623,270 A | * | 4/1997 | Kempkes et al. | 342/372 |
| 6,037,892 A | * | 3/2000 | Nikias et al. | 342/25 F |
| 6,181,270 B1 | * | 1/2001 | Dwyer | 342/25 R |
| 6,356,227 B1 | * | 3/2002 | Gibson et al. | 342/25 D |
| 6,603,424 B1 | * | 8/2003 | Abatzoglou | 342/25 R |
| 6,670,907 B2 | * | 12/2003 | Cho | 342/25 R |
| 6,737,938 B2 | | 5/2004 | Kitamori et al. | 333/161 |
| 6,781,541 B1 | * | 8/2004 | Cho | 342/25 D |
| 7,064,702 B1 | * | 6/2006 | Abatzoglou | 342/25 F |

\* cited by examiner

*Primary Examiner*—Bernarr E Gregory
(74) *Attorney, Agent, or Firm*—Charles L. Moore; Moore & Van Allen, PLLC

(57) ABSTRACT

A method to compensate for radar platform angular motion may include measuring or estimating any radar platform angular motion. The method may also include substantially decoupling each array subsection response of a plurality of array subsection responses from any radar platform angular motion by applying continuous time varying phase adjustments to each individual array subsection response, prior to forming composite array Sum and monopulse Delta beam responses The time varying phase adjustments may be determined in response to any radar platform angular motion measured or estimated.

35 Claims, 12 Drawing Sheets

RADAR PLATFORM ANGULAR MOTION COMPENSATION

BACKGROUND OF THE INVENTION

The present invention relates to radar systems, and more particularly to a method and system for compensating for radar platform angular motion in a phased array radar or the like.

Electronically scanned array (ESA) radar antennas provide many benefits in terms of beam control flexibility, antenna efficiency, and effective power delivery with no mechanically moving parts. Maximum tracking sensitivity and accuracy may be achieved through maximizing the signal to noise ratio by applying coherent integration over as long a dwell as feasible and limited by target Doppler spread and uncertainties in radar platform and target velocity change rates (acceleration). However when operated on board a missile, airframe, or other mobile platform with high levels of body roll and/or pitch and yaw rates, the body fixed ("strapdown") radar platform angular motion during the dwell spreads the angle measurement processing, such as monopulse beams, and exposes the angle measurement process to errors and reduced sensitivity through combinations of monopulse error slope nonlinearities, signal power variations during the dwell, and interfering effects from signals received from non-target sources, such as clutter, other targets, electronic countermeasures or similar sources. Antenna gains may also be reduced by the smearing. Since the antenna face may not be perpendicular to a line-of-sight to the target (for off-axis tracking), platform roll may also produce differential Doppler responses over the face of the array. This may result in Doppler spreading that reduces Doppler resolution and discrimination.

BRIEF SUMMARY OF THE INVENTION

In accordance with an embodiment of the present invention, a method to compensate for radar platform angular motion may include measuring or estimating any radar platform angular motion. The method may also include substantially decoupling each array subsection response of a plurality of array subsection responses from any phase array radar platform angular motion by applying continuous time varying phase adjustments to each individual array subsection response. The time varying phase adjustments may be determined in response to any radar platform angular motion measured or estimated. In accordance with an embodiment of the present invention, individual subsection transmit and/or receive responses are produced by the set of array elements composing that subsection and include the phase adjustments applied to individual elements within that subsection to provide the beam pointing control and alignment that achieves high composite gain. Subsection selections for applying continuous phase adjustments are normally adjoining sets of elements (such as array quadrant subsections) such that, since the subsections have smaller apertures than the full array, they have larger beam widths. This allows for processing responses over longer time durations since it takes longer for platform angular motion to take the target out of the subsection beams than the full array beam or beams.

In accordance with another embodiment of the present invention, a method to compensate for radar platform angular motion may include receiving a radar beam response at a phased array antenna including a plurality of subsections. Each array subsection may provide a subsection beam response. The method may also include digitally sampling each subsection beam response and digitally applying a phase shift to each subsection beam response based on any measured or estimated radar platform angular motion.

In accordance with another embodiment of the present invention, a radar system may include a sensor to sense any motion of a radar platform. The system may also include a module to substantially decouple each array subsection response of a plurality of array subsection responses from any sensed radar platform angular motion by applying continuous time (or stepped time) varying phase adjustments to each individual array subsection response. The time varying phase adjustments may be determined in response to any sensed radar platform angular motion.

In accordance with another embodiment of the present invention, a computer program product to compensate for radar platform angular motion may include a computer usable medium having computer usable program code embodied therein. The computer usable medium may include computer usable program code configured to substantially decouple each array subsection response of a plurality of array subsection responses from any sensed radar platform angular motion by applying continuous time varying phase adjustments to each individual array subsection response. The time varying phase adjustments may be determined in response to any radar platform angular motion measured or estimated.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

Figure 1:
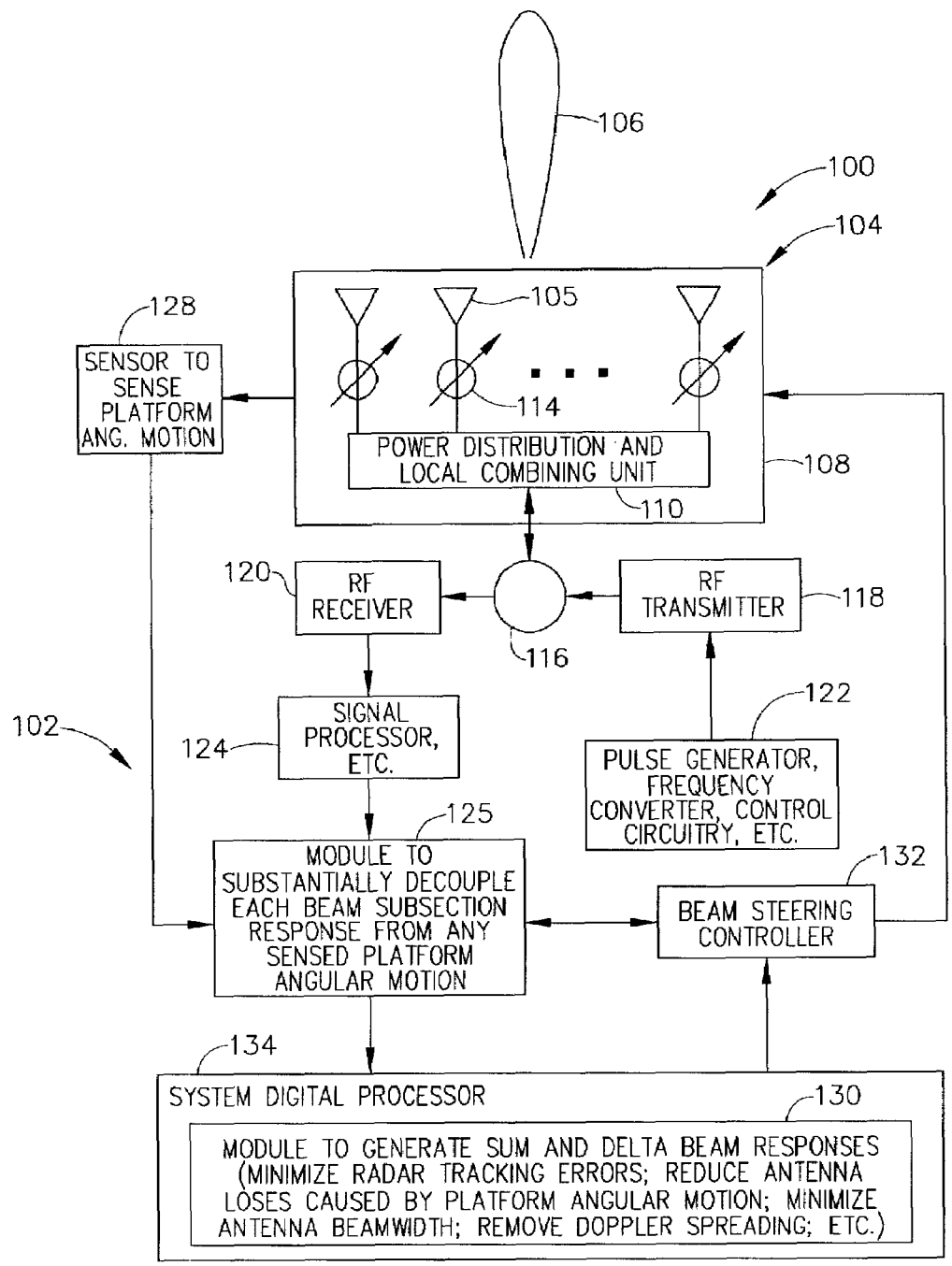
FIG. 1 is a block diagram of an example of a radar system including a system to compensate for radar platform angular motion in accordance with an embodiment of the present invention.

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 9:
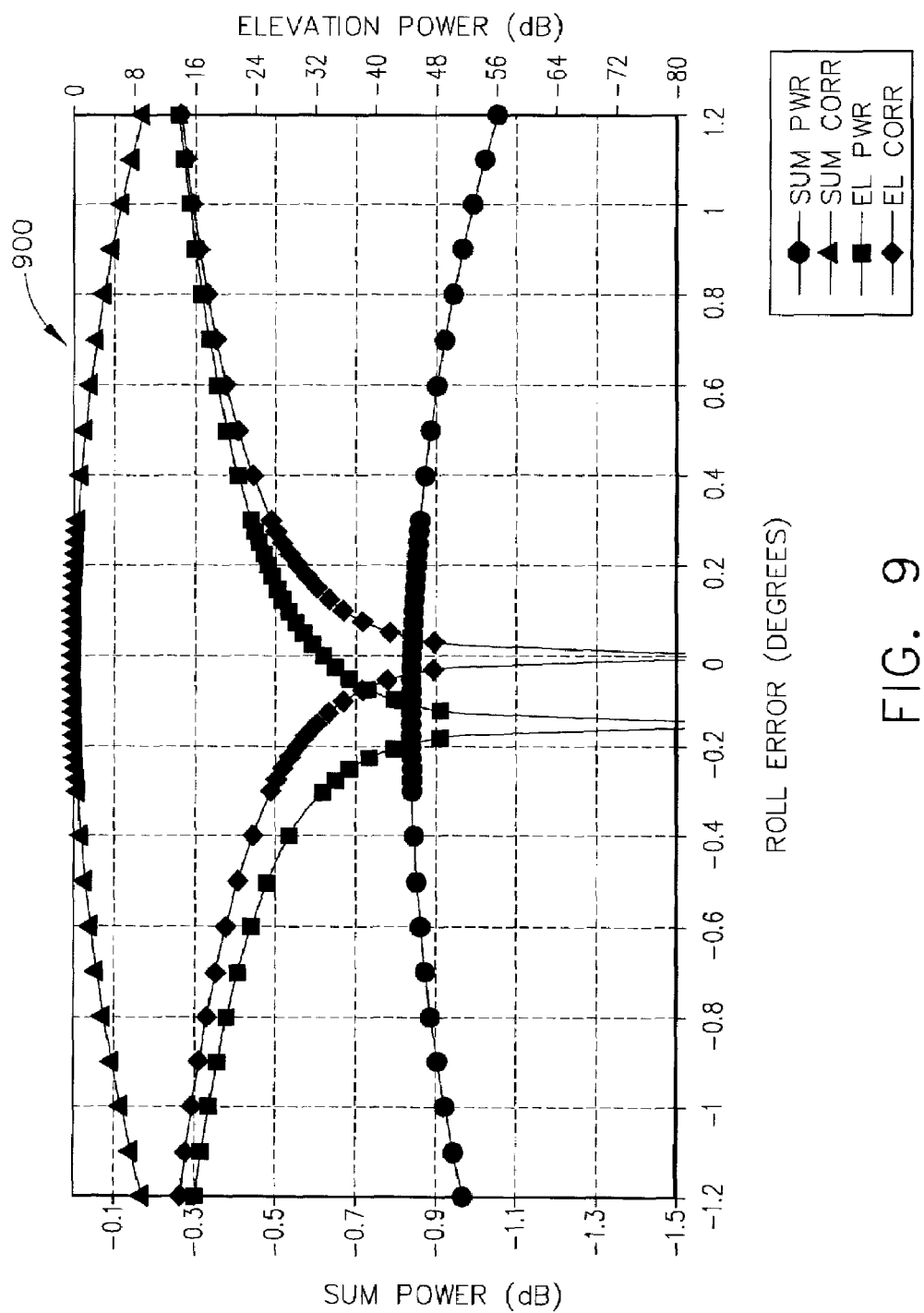
FIG. 9 is a graph illustrating an example of simulated responses with and without phase compensation applied to individual quadrant responses prior to forming monopulse Sum and Delta beams. It demonstrates the correction of boresight error shifts induced (for the uncompensated processing) by amplitude variations within the dwell.

FIG. 1 is a block diagram of an example of a phased array radar system 100 or similar system including a system 102 to compensate for radar platform angular motion in accordance with an embodiment of the present invention. The radar system 100 may include an antenna array 104 to transmit radar beams and to receive response or return beams 106. The antenna array 104 may include a set of elements 105 that are normally mounted on a flat plate 108 that may be fixed within any apparatus the array 104 may be mounted to, such an aerospace vehicle or the like. However, the array elements 105 could be mounted on a curved surface or on an apparatus within a platform system that may have independent pointing control (such as a gimbal mounted array or a similar arrangement). The antenna array 104 may be subdivided into quadrants or may be subdivided into smaller subsections for transmitting respective radar beams and receiving responses 106 corresponding to the respective subsections. Each of the plurality of subsection responses 106 may be coherently integrated or processed over a coherent processing interval (CPI) to detect or track any targets relative to the array 104. A group of subsection responses may be combined to form monopulse Sum and Delta beams, or other composite beams for the purpose of acquiring and tracking targets. As previously discussed, maximum tracking accuracy and sensitivity of the system 100 may be achieved through maximizing the signal to noise ratio by applying coherent (predetection) integration of the combined responses 106 over as long a dwell time or period as feasible. However, such sensitivity and accuracy may be limited by target Doppler spread and beam smearing caused by radar platform angular motion. These effects may be compounded by external effects such as target signal amplitude variations within the dwell, that may favor the target angular location at varying times within the dwell (instead of measuring the average target angle over the dwell). FIG. 9 is a graph illustrating an example of simulated responses 900 with and without phase compensation applied to individual quadrant responses prior to forming monopulse Sum and Delta beams. FIG. 9 illustrates that compensation may improve the Sum beam power (gain) and avoids monopulse shift errors induced by signal amplitude variations during the dwell. As described herein, the present invention substantially decouples each array subsection relative response from any radar platform angular motion that may be sensed, or expressed another way, compensates each array subsection response based on any radar platform angular motion, such that the composite Sum and Delta beams or any other composite formed beams remain fixed in inertial space, independent of the observed platform angular motion and other corrupting effects.

As previously discussed, the antenna array 104 may be mounted to the plate or platform 108 that may be mounted on or in a nose cone or fuselage and may be spatially fixed with respect to an aerospace vehicle, missile, or other platform. Therefore if the vehicle rotates, pitches, or yaws in orientation, the antenna array (and uncompensated beams) will share that motion. The antenna array 104 may include a power distribution and local combining unit 110 for feeding a plurality of radiating elements 105 forming the array 104. A phase shifter 114 or shifters may be associated with each radiating element 105 to generate the composite beam or beams. As described herein, additional time varying phase shifts may be applied to individual antenna subsections to compensate for radar platform angular motion.

A multiplexer 116 may respectively couple either a radio frequency (RF) transmitter 118 or an RF receiver 120 to the power distribution and combining unit 110. The RF transmitter 118 may be coupled to circuitry 122 for generating a radar beam for transmission in multiple subsections or quadrants (as described above). Examples of the circuitry 122 may include a pulse generator, a frequency converter, control circuitry and any other special equipment for generating a radar beam with predetermined characteristics.

The RF receiver 120 may be coupled to a signal processor 124 or the like to convert the RF signals to intermediate or baseband signals for processing. The signal processor 124 may be coupled to a module 125 to substantially decouple each array subsection response from any sensed platform angular motion that may be detected by a sensor 128. Examples of the module 125 and functions and features thereof will be described in more detail herein.

The system 100 may also include a module 130 or modules to generate monopulse Sum and Delta beam responses as describe in more detail herein. The process of compensating for the angular motion by applying changing phase shifts between quadrant or subsection responses may autonomically provide benefits or results, such as minimizing radar tracking errors; reducing antenna loses caused by platform angular motion during coherent processing intervals; minimizing antenna beamwidth; removing Doppler spreading on received return signals caused by differential relative Doppler shifts between individual array subsection responses; or similar advantages.

As described in more detail herein, the processing sequence in accordance with an embodiment of the present invention applies phase compensation to the individual radar array subsections responses, along with receive channel calibration adjustments, then forms one or more Sum and Delta beams. Narrow band filtering is then applied to each beam response. Since the beam forming and narrow band filtering are both linear operators, the sequence can be reversed, to apply the narrow band filtering to each subsection response, then form multiple (narrow bandwidth) beam responses from each filtered set of subsection responses. Normally, if many different narrow band frequency responses are needed, it may be better to generate the beam responses prior to applying the filtering (requiring fewer combiners), whereas if many beams are needed at the same narrow band frequency, it may be better to apply the filtering prior to generating the individual beam responses (requiring fewer filters). The final step after the narrow band (complex—real and imaginary parts) Sum and Delta beams have been generated may be to compute the boresight errors. There may be different targets in different Doppler bins that can be independently tracked in separate Delta beam nulls. It will be noted that in digital processing embodiments, it may be possible to dynamically switch between doing the beam forming ahead of narrow band filtering, or filtering prior to beam forming, depending on identified scenario needs and available signal processing resources.

The system 100 may further include a beam steering controller 132 to control direction or orientation of the transmitted and received beams 106 from the array 104. The beam steering controller 132 may receive data from one or more of the modules 130 and the system digital processor 134 to perform the different functions described above. The beam controller 132 may then provide signals to the phase shifters 114 in response to data from the system digital processor 134 to control the characteristics of the beams 106 to perform a selected function.

The local combining unit 110 or network controlled by the beam steering controller 132 phase shift adjustments to each element 105 produces co-aligned (Sum) beams 106 (all pointing in the same direction) from each subsection. The beamwidths of the smaller subsections are larger than the composite beamwidth of the combined array (since (optimal) antenna beamwidths are proportional to the wavelength divided by the aperture diameter (projected onto the plane perpendicular to the line-of-sight)). The only differences between the subsection responses are their relative phases (when a target is within the main beams of the subsections (as opposed to their sidelobes), the amplitudes of the returns from each (equal sized) subsection is (approximately) the same). Therefore, just as the individual element (broad beam) responses are combined with appropriate phase shifts to form the individual subsection (Sum beam) responses, the subsection responses are combined with appropriate phase shifts to form the composite array monopulse Sum and Delta beam responses. Although many different receive Sum and Delta beam responses can be produced within the beamwidth of the subsections, by splitting the received subsection responses and applying different relative phase shifts to each set prior to combining the subsection responses, it normally makes sense to only generate a single transmit (Sum) beam (to maximize the power on the estimated target location). All composite receive beams and the transmit beam are subject to smearing (in angle and Doppler frequency) due to platform angular motion during the CPI. Individual subsection responses are also smeared by the motion. However, since the subsection beamwidths are larger (and the individual elements are closer together), the effects of the smearing are diminished. Furthermore, by applying time varying differential phase shifts to the subsection responses prior to forming the composite beam responses, the peak(s) of the Sum beam(s) and the nulls of the Delta beams (there are always at least two nulls, one for the array Azimuth Delta beam and one for the orthogonal Elevation Delta beam) remain fixed in inertial orientation independent of the (compensated) platform angular motion during the CPI. In principle, time varying phase shifts could be applied to each element response before combining the responses; however that is normally impractical due to the (relatively) large numbers of elements.

Even though the nulls of the uncompensated Delta beams move during the CPI, the coherent integration process provides a single composite (average) null response (of nearly equal depth). A problem solved by the present invention is that the position of the null is unstable, since signal amplitude variations during the CPI can bias the location in the direction of the null location when the signal was strongest (see FIG. 9).

Figure 2A:
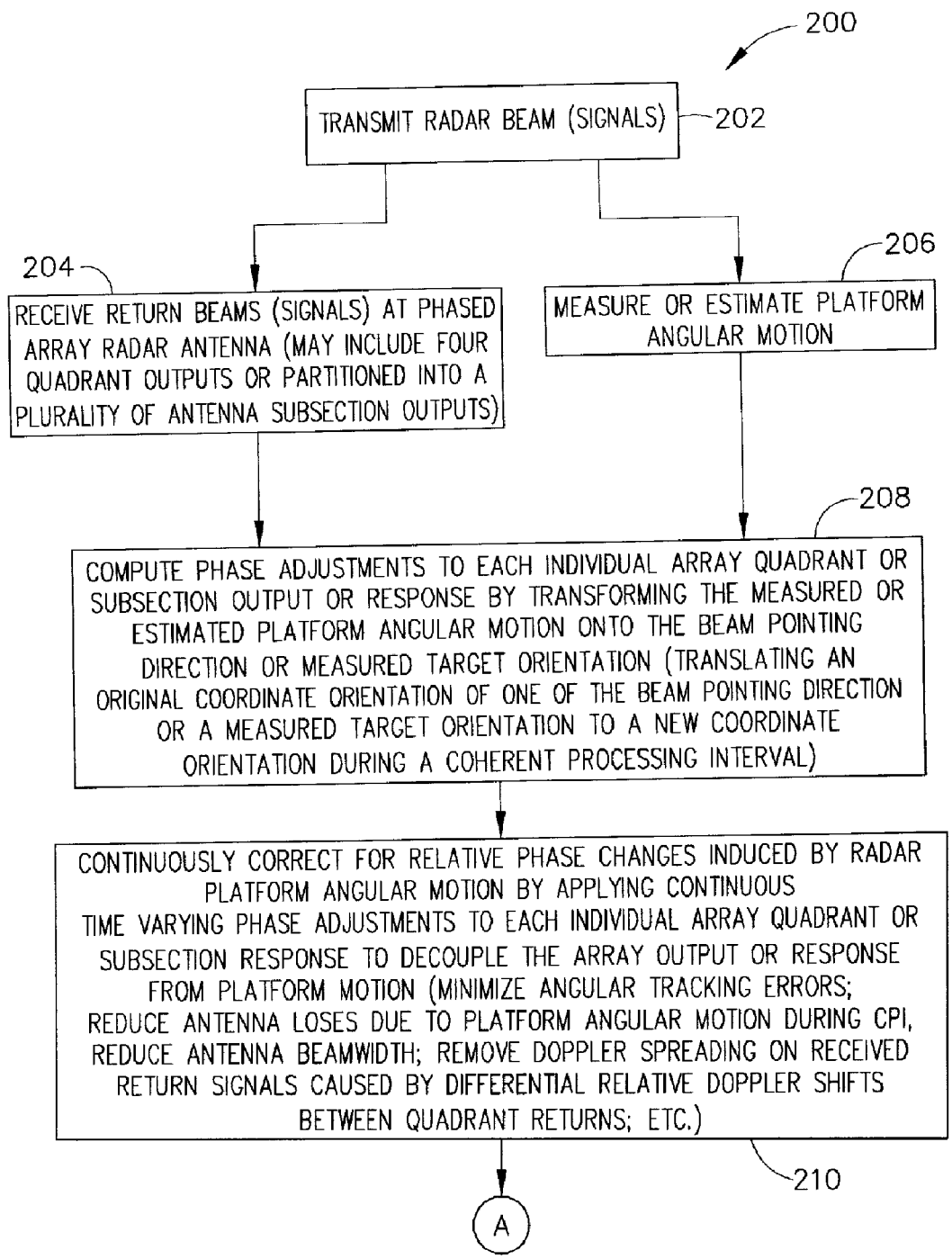
FIGS. 2A and 2B (collectively FIG. 2) are a flow chart of an example of a method to compensate for radar platform angular motion in accordance with an embodiment of the present invention.
Figure 2B:
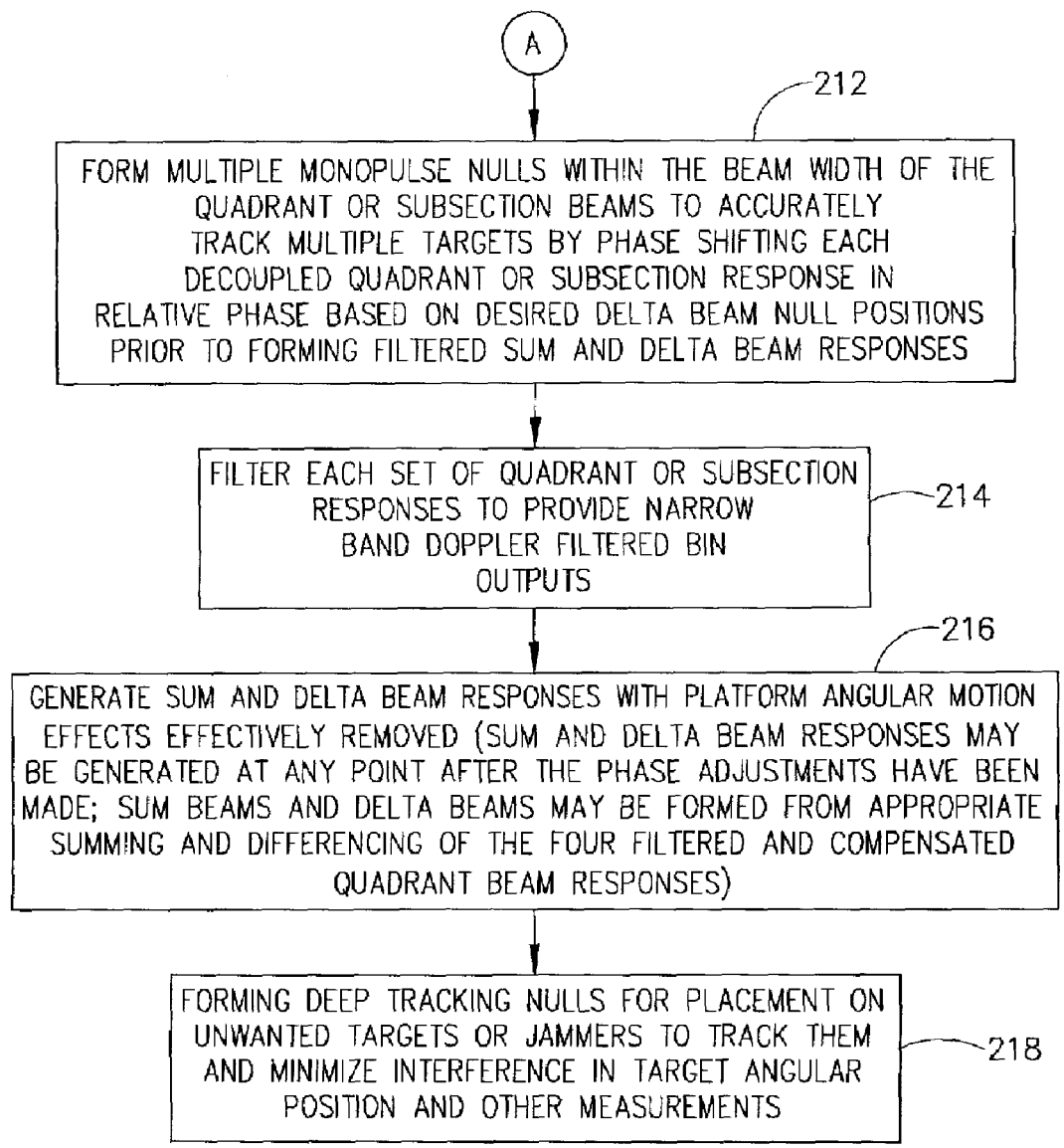

FIGS. 2A and 2B (collectively FIG. 2) are a flow chart of an example of a method 200 to compensate for radar platform angular motion in accordance with an embodiment of the present invention. The method 200 may be embodied in the system 100 of FIG. 1. In block 202, a transmit radar beam or signal may be transmitted. Similar to that described with respect to system 100, multiple beams or beam lobes may be transmitted in multiple directions from a phased array radar similar to array 104 in FIG. 1. The present invention may be described herein as generating beams and receiving responses from four quadrant subsections of the array. However, the present invention is not intended to be limited to the number of subsections that the phased array may be partitioned into and the principles and features of the present invention may be applicable to any number of array subsections or array subsection responses, beams or other array characteristics.

In block 204, return beams or return array subsection responses or signals may be received at the phased array radar antennas. As previously discussed, the array may include four quadrant outputs or the array may be partitioned into any number of antenna subsection outputs.

In block 206, angular motion of the radar array platform may be sensed, measured or estimated. If the radar array platform is mounted to an aerospace vehicle, the three-dimensional motion measured or estimated may include yaw, pitch and roll motions or attitudes normally encountered by such vehicles in flight.

In block 208, phase adjustments to each individual array quadrant or subsection output or response may be computed. The phase adjustments may be computed by transforming the measured or estimated platform angular motion onto a beam pointing direction or a measured target orientation. An original coordinate orientation of one of the beam pointing direction or a measured target orientation may be translated to a new coordinate orientation in response to the measured or estimated platform angular motion during a coherent processing interval.

Figure 7:
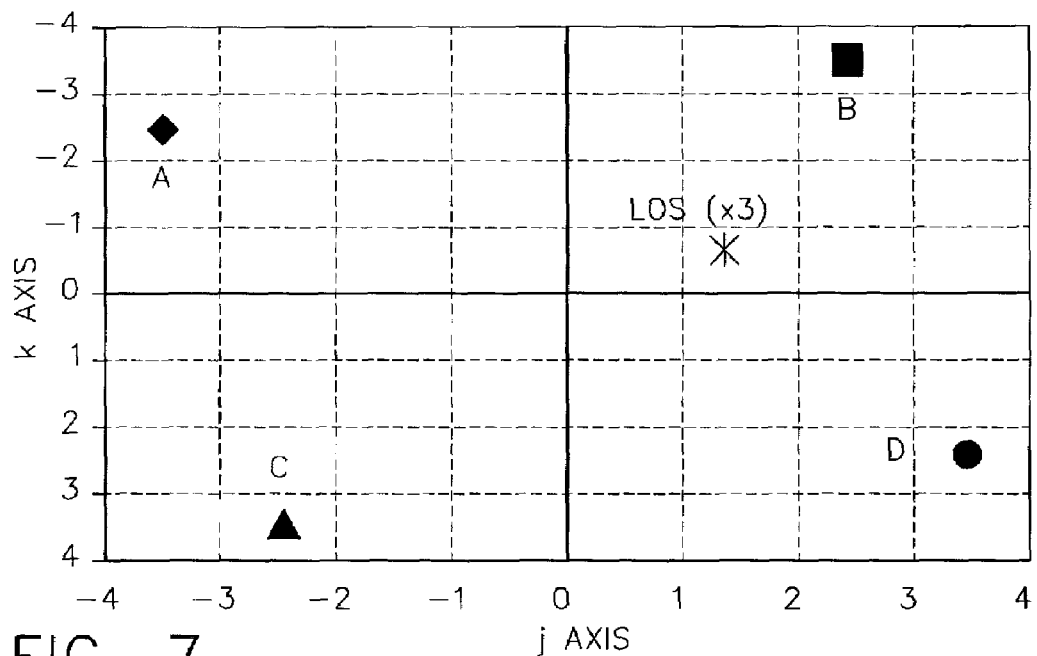
FIG. 7 is an illustration of quadrant centroid orientations and beam pointing angle resulting from platform rotations, as used in a phased array radar system for use in an example of determining phase adjustments to compensate for radar platform motion in accordance with an embodiment of the present invention.
Figure 8:
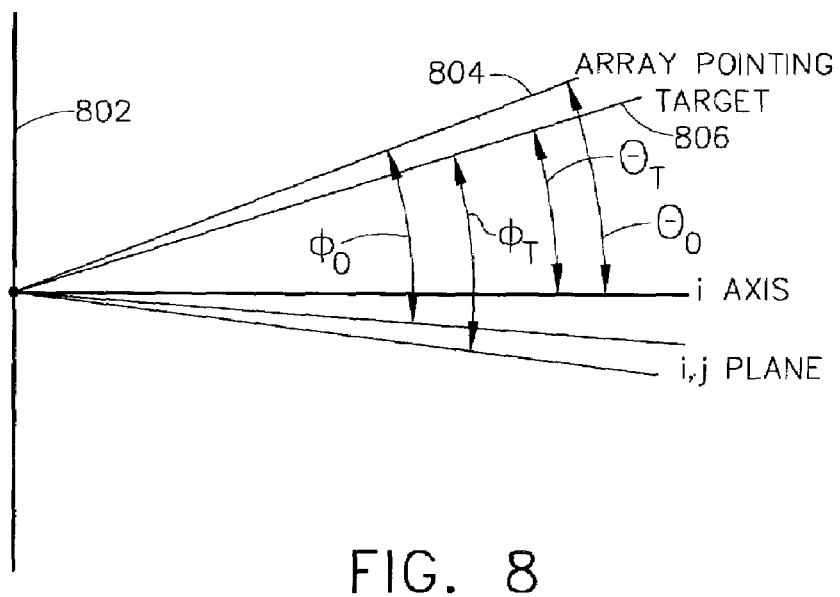
FIG. 8 is an example of target and array pointing vectors for use in explaining an example of computing phase adjustments to radar array subsection responses to compensate for radar platform angular motion in accordance with an embodiment of the present invention.

As an example, representative processing for computing phase compensation for quadrant subsections of a monopulse antenna is described below with reference to FIGS. 7 and 8. Simulated responses based the processing are illustrated in FIG. 9. FIG. 9 shows that the compensation achieved about 1 dB improvement in Sum beam gain and eliminated an 0.15 degrees boresight error due to amplitude variations for a scenario with 9 degrees roll during the dwell, a 30 degree pointing angle off the array axis, and a ±10% amplitude variation during the CPI. In FIG. 8, an array surface is represented by line 802. An array pointing vector is represented by line 804 and a target vector is represented by line 806.

Four Quadrant responses (A, B, C, and D) may be considered as point sources offset from the center of the phased array radar by d*sqrt (2) (see FIG. 7), where d represents a distance from the center of the array. An (i,j,k) coordinate system may be defined as i: perpendicular to the array surface, j: to the right, and k: down. Quadrant locations are: A=(0,−d,−d), B=(0,d,−d), C=(0,−d, d), and D=(0,d,d) at zero roll. If the antenna roll angle is $\phi$ (See FIG. 7), then the Quadrant locations are given by: A=(0,xo*cos ($\phi$)+yo*sin ($\phi$), −xo*sin ($\phi$)+yo*cos ($\phi$)), where (xo,yo) is the (j,k) locations at zero roll. Assuming an off-axis target return signal at a cone angle of $\theta_T$ at roll angle $\phi_T$ (target to the right) (see FIG. 8). The (i,j,k) line of sight (LOS) vector of the return is: [cos ($\phi_T$), sin ($\phi_T$)*cos ($\phi_T$), −sin ($\phi_T$)*sin ($\phi_T$)]. The relative offsets (Z) between the Quadrants (relative to the origin) along the LOS is the dot product of the locations and the LOS vector:

$$Z = \sin(\phi)*\{xo*\cos(\phi_T)*\cos(\phi_T)+yo*\sin(\phi)*\cos(\phi_T)+ \\ xo*\sin(\phi)*\sin(\phi_T)-yo*\cos(\phi)*\sin(\phi_T)\}=\sin(\phi_T) \\ *\{xo*\cos(\phi-\phi_T)+yo*\sin(\phi-\phi_T)\}.$$

For a wavelength of $\Lambda$, the (unit amplitude) signals can be defined in terms of their relative offsets and phases by:

$$X_A = e^{-j*Z_A}, Z_A = -d * \frac{2\pi}{\lambda} * \sin(\theta_T) * (\cos(\phi - \phi_T) + \sin(\phi - \phi_T))$$

$$X_B = e^{-j*Z_B}, Z_B = d * \frac{2\pi}{\lambda} * \sin(\theta_T) * (\cos(\phi - \phi_T) - \sin(\phi - \phi_T))$$

$$X_C = e^{-j*Z_C}, Z_C = -d * \frac{2\pi}{\lambda} * \sin(\theta_T) * (\cos(\phi - \phi_T) - \sin(\phi - \phi_T)) = -Z_B$$

$$X_D = e^{-j*Z_D}, Z_D = d * \frac{2\pi}{\lambda} * \sin(\theta_T) * (\cos(\phi - \phi_T) + \sin(\phi - \phi_T)) = -Z_A$$

The monopulse Sum and Delta (complex) signals may be defined by:

$$\Sigma = X_A + X_B + X_C + X_D = 2*(\cos(Z_A) + \cos(Z_B))$$

$$Del_{AZ} = X_A - X_B + X_C - X_D = -2*(\sin(Z_A) - \sin(Z_B))$$

$$Del_{EL} = X_A + X_B - X_C - X_D = -2j*(\sin(Z_A) + \sin(Z_B))$$

The nominal estimates for the monopulse errors are proportional to the (Arc tan) of the ratio of the real part of the quadrature products of the Sum and Delta signals to the Sum signal power:

$$Az = A\tan\left[\frac{\text{Re}(\sum, Del_{AZ})}{(\Sigma, \Sigma)}\right]$$

$$El = A\tan\left[\frac{\text{Re}(\sum, Del_{El})}{(\Sigma, \Sigma)}\right]$$

Where the inner product is the Sum signal times the 90 degree rotated Delta (multiplied by −j):

$$(a + jb, c + jd) = (a + jb) * (-jc + d) = a*d + b*c + j*(-a*c + b*d)$$

$$RZ = \frac{\text{Re}(\sum, Del_{AZ})}{(\sum, \sum)} = \frac{\sin(Z_B) - \sin(Z_A)}{\cos(Z_A) + \cos(Z_B)}$$

$$RL = \frac{\text{Re}(\sum, Del_{EL})}{(\sum, \sum)} = \frac{\sin(Z_A) + \sin(Z_B)}{\cos(Z_A) + \cos(Z_B)}$$

For $\phi - \phi_T = 0$, $Z_B = -Z_A$, $AZ = -Z_A$, $El = 0$. For $100 - \phi_T = 90$, $Z_A = Z_B$, $AZ = 0$, $EL = -Z_A$.

For any array several wavelengths in size with electronic beam steering, each Quadrant centroid is shifted in phase as follows:

$$Z'_A = -d * \frac{2\pi}{\lambda} * [\sin(\theta_T) * (\cos(\theta - \theta_T) + \sin(\theta - \theta_T)) - \sin(\theta_o) * (\cos(\theta_o) + \sin(\theta_o))]$$

$$Z'_B = -d * \frac{2\pi}{\lambda} * [\sin(\theta_T) * (\cos(\theta - \theta_T) + \sin(\theta - \theta_T)) - \sin(\theta_o) * (\cos(\theta_o) + \sin(\theta_o))]$$

$$Z'_C = -d * \frac{2\pi}{\lambda} * [\sin(\theta_T) * (\cos(\theta - \theta_T) + \sin(\theta - \theta_T)) - \sin(\theta_o) * (\cos(\theta_o) + \sin(\theta_o))] = -Z'_B$$

$$Z'_D = -d * \frac{2\pi}{\lambda} * [\sin(\theta_T) * (\cos(\theta - \theta_T) + \sin(\theta - \theta_T)) - \sin(\theta_o) * (\cos(\theta_o) + \sin(\theta_o))] = -Z'_A$$

Where $(\theta_o, \phi_o)$ represents the current array pointing angle. $Z_A'$ and $Z_B'$ can be extracted from the ratios, then the angles $\theta_T$ and $\phi_T$ can be computed from the above:

$$\frac{\sin(Z'_A)}{\cos(Z'_A) + \cos(Z'_B)} = \frac{RZ + RL}{2}, \tan(Z'_A) = -\frac{RZ + RL}{2} * \left(1 + \frac{\cos(Z'_B)}{\cos(Z'_A)}\right)$$

$$\frac{\sin(Z'_B)}{\cos(Z'_A) + \cos(Z'_B)} = \frac{RZ - RL}{2}, \tan(Z'_B) = -\frac{RZ - RL}{2} * \left(1 + \frac{\cos(Z'_A)}{\cos(Z'_B)}\right)$$

If the target is in the main beam, the cosine functions are positive. Generally, the cosine functions are closer to one than zero. Therefore the above equations can be solved by initially assuming the cosine functions are 1, and then iterating to obtain the true values. For example, suppose the values are $Z_A' = 1$, and $Z_B' = -0.7$ (relatively large values, normally close to a full beamwidth error for a circular array). Then the values for the measurements obtained above would be as follows, and the iteration estimates ($Z_1$, $Z_2$, etc.) would give:

$$\sin(Z'_A) = 0.8415 \ \cos(Z'_A) = 0.5403$$

$$\sin(Z'_B) = -0.6442 \ \cos(Z'_B) = 0.7948$$

$$\tan(Z'_{A1}) = -(RZ + RL) = 1.2895 \ \tan(Z'_{B1}) = RZ - RL = -0.9872$$

$$Z'_{A2} = 0.9112 \ Z'_{b1} = 0.7790 \ \cos(Z'_{A1}) = 0.6129 \ \cos(Z'_{B1}) = 0.7116$$

$$\tan(Z'_{A2}) = -\frac{RZ + RL}{2} * \left[1 + \frac{\cos(Z'_{B1})}{\cos(Z'_{A1})}\right] = 1.3934$$

$$\tan(Z'_{B2}) = -\frac{RZ + RL}{2} * \left[1 + \frac{\cos(Z'_{A1})}{\cos(Z'_{B1})}\right] = -0.9167$$

$$Z'_{A2} = 0.9483 \ Z'_{B2} = -0.7430$$

Generally two iterations may be good enough (5% errors above). Accuracy is better (convergence faster) for smaller initial errors and normally only the initial estimate can be used. Given estimates for $Z_A'$ and $Z_B'$, the target angles may be estimated (note that $\theta_o$, $\phi_o$, and $\phi$ are normally known):

$$\sin(\theta_T) * (\cos(\phi - \phi_T) + \sin(\phi - \phi_T)) =$$
$$QA = \sin(\theta_0) * (\sin(\phi_0) - \cos(\phi_0)) - \frac{Z'_A * \lambda}{2\pi * d}$$

$$\sin(\theta_T) * (\cos(\phi - \phi_T) + \sin(\phi - \phi_T)) =$$
$$QB = \sin(\theta_0) * (\sin(\phi_0) - \cos(\phi_0)) - \frac{Z'_A * \lambda}{2\pi * d}$$

$$\sin(\theta_T) * \sin(\phi - \phi_T) = QA - QB$$

$$\sin(\theta_T) * \cos(\phi - \phi_T) = QA + QB$$

$$\sin(\theta_T) = \sqrt{2 * (QA^2 - QB^2)}$$

$$\tan(\phi - \phi_T) = \frac{QA - QB}{QB + QA}$$

Assuming the array is rotating at a constant rate (w) about the array axis: $\phi = \phi_1 + w*t$:

$$\sin(\Box - \Box_T) = \sin(\Box_1 - \Box_T * \cos w * t) + \cos(\Box_1 - \Box_T * \sin w * t)$$

$$\cos(\Box - \Box_T) = \cos(\Box_1 - \Box_T * \cos w * t) - \sin(\Box_1 - \Box_T * \sin w * t)$$

Where $\phi_1$ is the roll at the center of the dwell and t runs from $-T/2$ to $+T/2$ for dwell duration T. Normally, the coherent integration dwell will be small enough such that $\cos(w*t) \approx 1$, $\sin(w*t) \approx w*t$. Then the Z's can be represented by:

$$Z'_A \simeq -d * \frac{2\pi}{\lambda} * [\sin(\theta_T) * (\cos(\phi_1 - \phi_T) * (1 + w*t) + \sin(\phi_1 - \phi_T) * (1 - w*t)) - \sin(\theta_o) * (\cos(\phi_o) - \sin(\phi_o))] =$$
$$Z'_{A0} + w*t*d*\frac{2\pi}{\lambda} * \sin(\theta_T) * (\sin(\phi_1 - \phi_T) - \cos(\phi_1 - \phi_T))$$

$$Z'_B \simeq d * \frac{2\pi}{\lambda} * [\sin(\theta_T) * (\cos(\phi_1 - \phi_T) * (1 - w*t) - \sin(\phi_1 - \phi_T) * (1 + w*t)) - \sin(\theta_o) * (\cos(\phi_o) - \sin(\phi_o))] =$$
$$Z'_{B0} - w*t*d*\frac{2\pi}{\lambda} * \sin(\theta_T) * (\sin(\phi_1 - \phi_T) + \cos(\phi_1 - \phi_T))$$

$$Z'_C = -Z'_B \ Z'_D = -Z'_A$$

Normally when the Sum and Delta signals are generated continuously and integrated over the dwell, the blurring of the phases may produce some reduction in sensitivity and may subject the measurements to biases if there are amplitude variations over the dwell. Amplitude variations can result from range variations, polarization variation with roll angle, changes in aspect angle of the target, etc. If the signal return under track is dominated by signals produced intentionally by the target (repeater or noise jammer), deliberate amplitude modulation may be applied. These effects are normally relatively small (for passive targets) but can still result in significant errors for high performance radars. These effects can be removed by applying corrective frequency shifts (time varying phase) to each quadrant signal prior to computing the Sum and Delta signals. We can estimate the desired frequencies by using $(\theta_o, \phi_o)$ for the unknowns $(\theta_T, \phi_T)$ above.

Returning to FIG. 2, in block 210, each individual array quadrant or subsection response may be continuously corrected for relative phase changes induced by radar platform angular motion by applying continuous time varying phase adjustments to each individual array subsection response. The phase adjustments may be applied to each individual array subsection response by a complex multiply operation as described in more detail with respect to system 400 in FIG. 4. Continuously applying the phase shift adjustments to each array subsection output or response will substantially decouple each array subsection response from the platform angular motion. Examples of benefits derived from correcting for relative phase changes induced by any measured or estimated radar platform angular motion may include minimizing radar or angular tracking errors; reducing antenna loses caused by platform angular motion during a coherent processing interval; reducing antenna beamwidth; removing Doppler spreading on received return signals caused by differential relative Doppler shifts between quadrant returns; and similar functions.

In block 212, multiple monopulse nulls may be formed within the beamwidth of the quadrant or other array subsections to accurately track multiple targets. The multiple monopulse nulls may be formed by phase shifting each decoupled quadrant or subsection response in relative phase based on desired delta beam null positions prior to forming filtered Sum and Delta beam responses. Different beam pointing directions can then be generated by applying different relative phase shifts between the compensated quadrant or subsection responses.

In block 214, each quadrant or subsection response may be filtered to provide narrow band Doppler filtered bin outputs. These filtered responses constitute the outputs coherently integrated over the dwell. In block 216, monopulse Sum and Delta beam responses may be generated with platform angular motion effects effectively removed. The Sum and Delta beam responses may be generated at any point after the phase adjustments have been made. The Sum and Delta beams may be formed from appropriate summing and differencing of the filtered and compensated quadrant beam responses or subsection responses. A Sum beam and two Delta beams, one Delta beam for azimuth monopulse measurements and another for elevation monopulse measurements, may be formed.

In block 218, deep tracking nulls may be formed from the adjusted subsection response by focusing beams at the desired location. The deep tracking nulls may be used to track any unwanted targets or sources of electronic countermeasures (jammers). By positioning the null on the interfering source, its effects on the desired target measurements can be minimized.

Figure 3A:
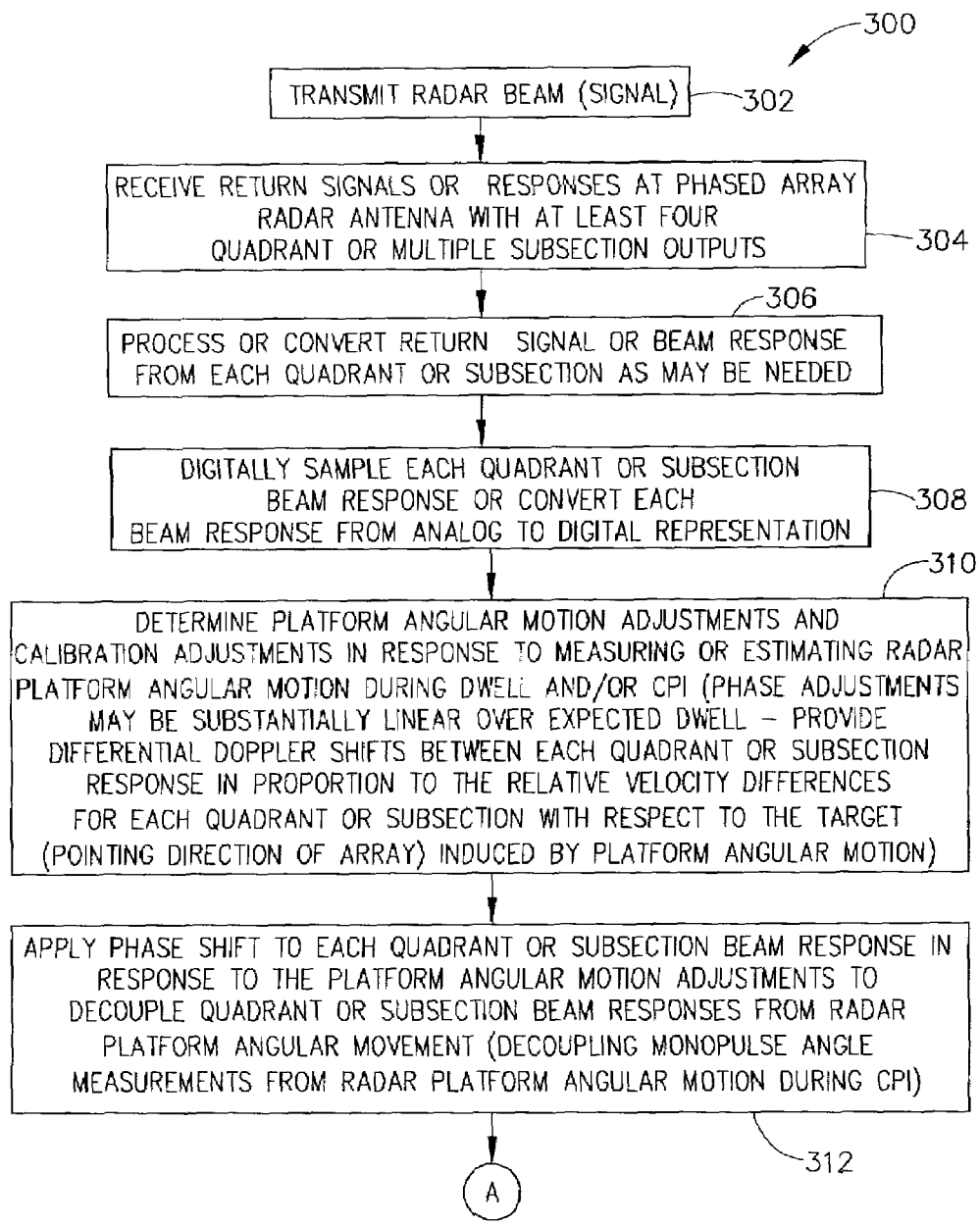
FIGS. 3A and 3B (collectively FIG. 3) are a flow chart of an example of a method to compensate for radar platform angular motion in accordance with another embodiment of the present invention.
Figure 3B:
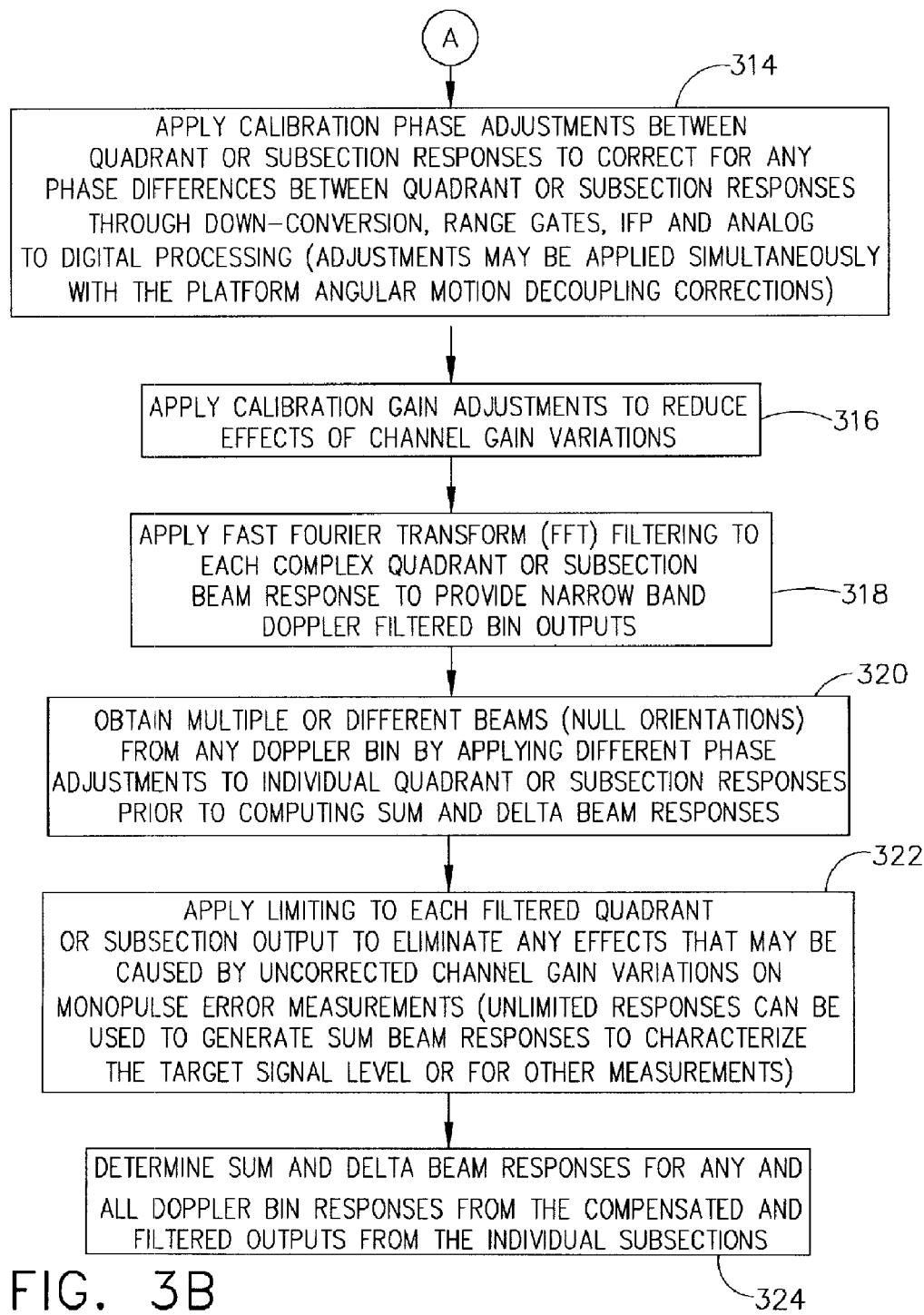

FIGS. 3A and 3B (collectively FIG. 3) are a flow chart of an example of a method 300 to compensate for radar platform angular motion in accordance with another embodiment of the present invention. The method 300 may be embodied in the system 100 of FIG. 1. In block 302, a radar beam or signal may be transmitted from a phased array radar system, such as the system 104 of FIG. 1. In block 304, return signals or beam responses may be received at the phase array radar antenna. The phased array antenna may have at least four quadrant outputs or the array may be partitioned into any number of subsections. In block 306, the return signal or beam response from each quadrant or subsection may be processed or converted as needed.

In block 308, each quadrant or subsection beam response may be digitally sampled to convert each beam response from an analog signal to a digital representation. In block 310, radar array platform angular motion adjustments and calibration adjustments may be determined in response to measuring or estimating the radar platform angular movement during a dwell time and/or a coherent processing interval. Phase adjustments may be substantially linear over an expected dwell. The resulting linear phase adjustments provide differential Doppler shifts in proportion to the relative velocity differences for each quadrant or subsection with respect to the target or pointing direction of the array induced by platform angular motion.

In block 312, a phase shift may be applied to each quadrant or subsection beam response based on the platform angular motion adjustments to decouple the beam responses from the radar platform angular movement. Accordingly, monopulse angle measurements are effectively decoupled from radar platform angular motion during a coherent processing interval.

In block 314, calibration phase adjustments may be applied between quadrant or subsection beam responses to correct for any known phase differences between quadrant or subsection responses through down-conversion, range gates, intermediate frequency processing and analog-to-digital processing. Calibration adjustments are normally obtained from factory or vehicle platform measurements carried out prior to engaging the target(s). Calibration phase adjustments may be applied simultaneously with the platform angular motion decoupling corrections or compensation, by adding the fixed calibration adjustments to the computed time varying responses prior to applying the corrections.

In block 316, calibration gain adjustments may also be applied to reduce effects of channel gain variations. However, if the quadrant or subsection responses are individually processed all the way to the Doppler narrow band filtered outputs, similar to that illustrated in the embodiment of the present invention in FIG. 4, then the monopulse Sum and Delta beam responses can be computed individually in each desired Doppler bin. Since the quadrant or subsection beams are normally co-aligned and have similar beams, amplitude variations between quadrant or subsection responses can be ignored (by normalizing each response to a constant) prior to forming the monopulse outputs. Therefore, channel gain adjustments are unnecessary with this embodiment.

In block 318, filtering may be applied to each complex quadrant or subsection beam response to provide narrow band Doppler filtering bin outputs. The filtering applied may be Fast Fourier Transform (FFT) filtering or the similar filtering to form the bin outputs.

In block 320, multiple or different beams or null orientations may be obtained from any Doppler bin by applying different phase adjustments to individual quadrant or subsection responses prior to computing the Sum and Delta beam responses. In block 322, limiting may be applied to each filtered quadrant or subsection output to eliminate any effects that may be caused by uncorrected channel gain variations on monopulse error measurements. Unlimited responses may be used separately to generate Sum beam responses to characterize the target signal level or for other measurements. Limiting may be an alternative that makes channel calibration gain adjustments unnecessary for purposes of angle measurements, if applied after filtering but before Sum and Delta beam formation. Limiting before filtering can generate unwanted harmonics and frequency interactions if the bandwidth is fairly wide compared to the center frequency at that point. Accordingly, it may be possible to apply limiting prior to filtering if the carrier frequency at that point is high relative to the bandwidth at that point so that in-band mixing products are avoided.

In block 324, Sum and Delta beam responses may be determined for any and all Doppler bin responses from the compensated and filtered outputs from the individual quadrants or subsections.

Figure 3C:
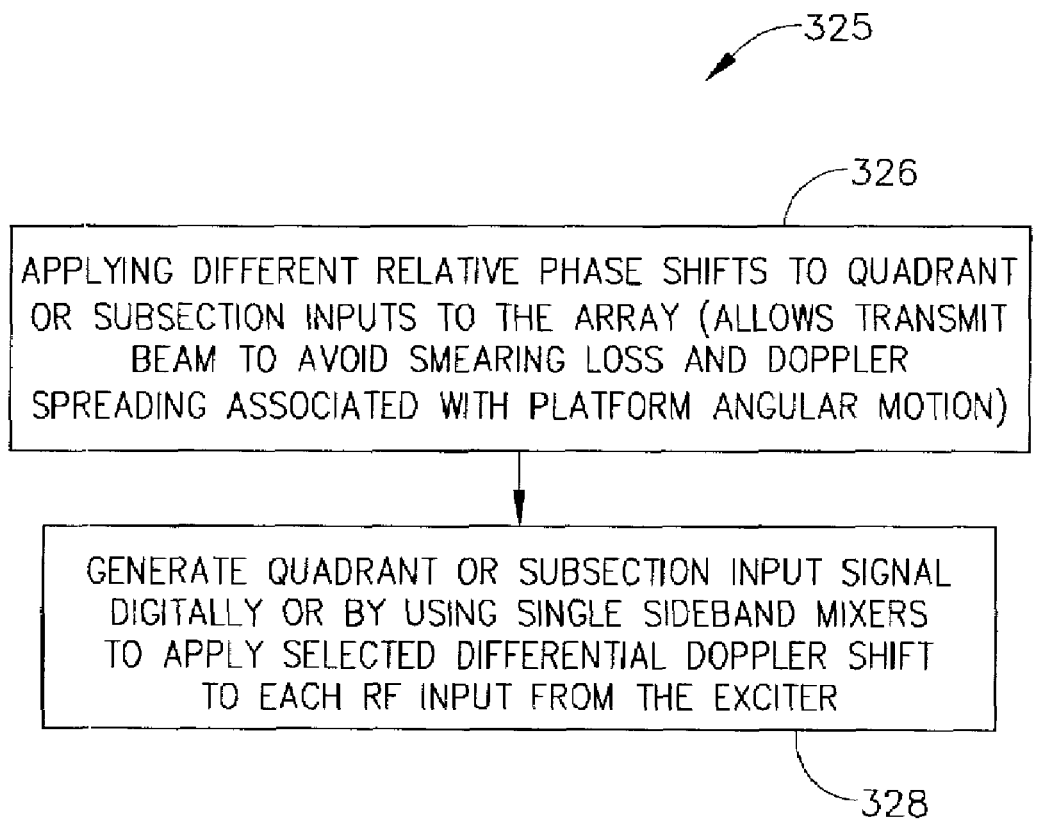
FIG. 3C is a flow chart of an example of a method to compensate for radar platform angular motion in a transmitted radar beam in accordance with an embodiment of the present invention.
Figure 5:
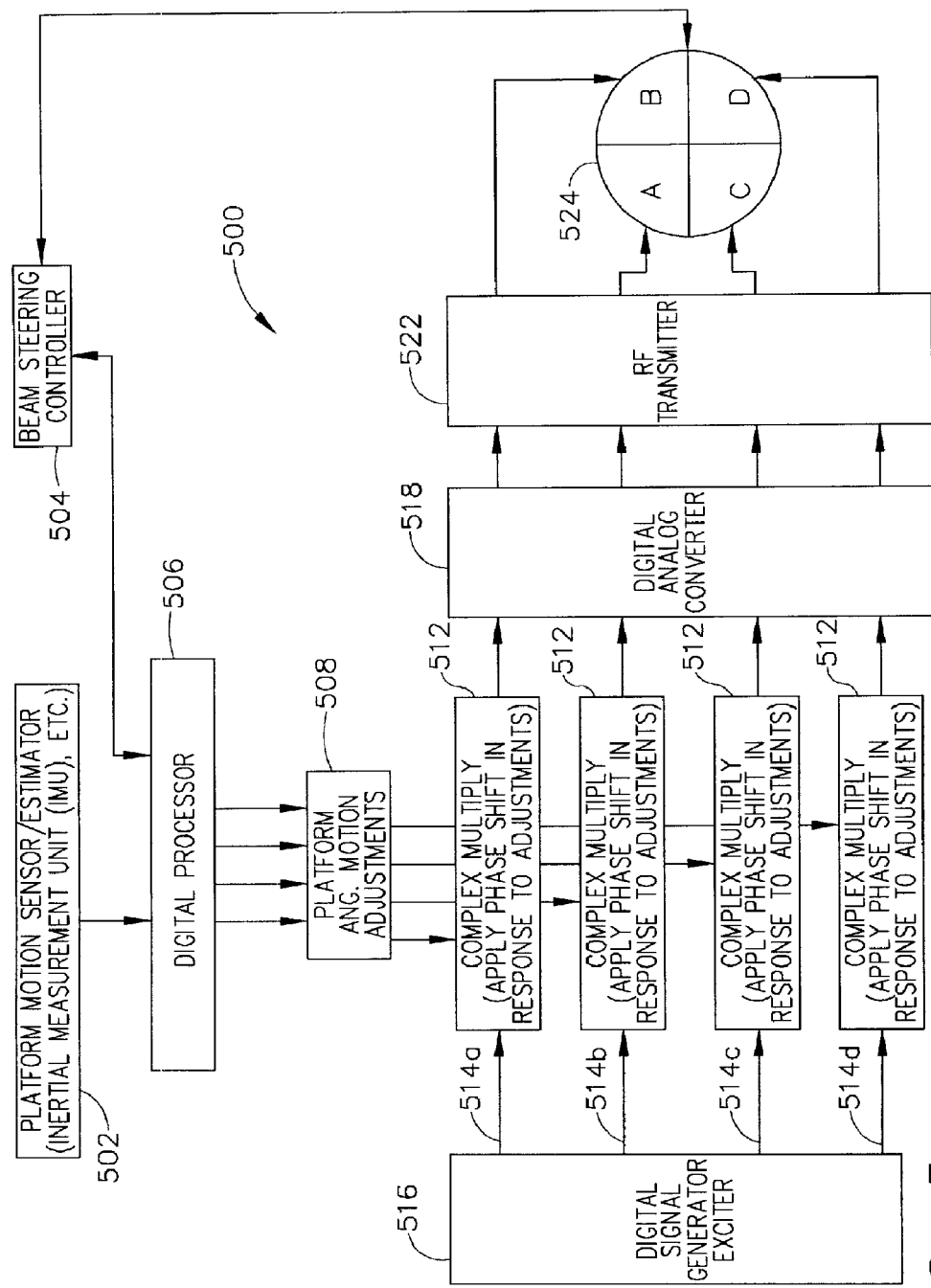
FIG. 5 is a block diagram of an example of a system to compensate for radar platform angular motion in a transmitted radar beam in accordance with an embodiment of the present invention.

While the present invention thus far has be described as decoupling beam responses from platform angular motion, the principles of the present invention may also be applied to compensate for platform angular motion in the output radar beam or transmitted radar beam as illustrated in the embodiment shown FIG. 3C and FIG. 5. FIG. 3C is a flow chart of an example of a method 325 to compensate for radar platform angular motion in a transmitted radar beam in accordance with an embodiment of the present invention. Compensation may be applied to a transmit radar beam in response to any measured or estimated platform angular motion to maximize effective antenna gain on a target and to minimize Doppler spreading of the signals illuminating a target. In block 326, different relative phase shifts to correct for platform angular motion may be applied to quadrant or subsection inputs to the array. This permits the transmit beam to avoid smearing loss and Doppler spreading associated with platform angular motion. An example of a system 500 for applying different relative phase shifts to the quadrant input will be described herein with reference to FIG. 5.

In block 328, the quadrant input signals corrected for platform angular motion may be generated digitally or by using single sideband mixers to apply a selected differential Doppler shift to each RF input from an exciter or signal generator. An example of a system 600 to apply a selected differential Doppler shift to each RF input by using a single sideband mixer is described herein with reference to FIG. 6.

Figure 4A:
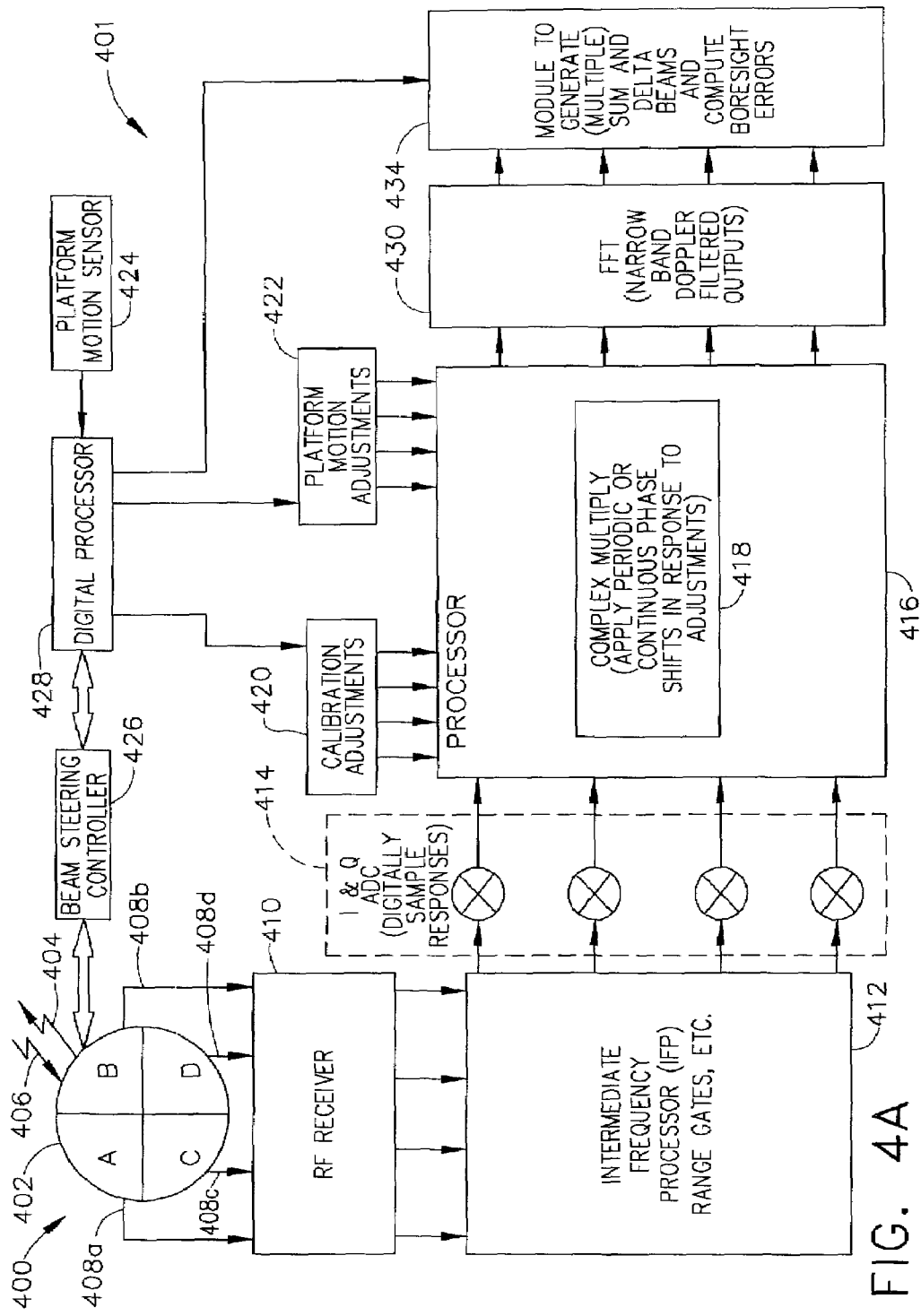
FIG. 4A is a block diagram of an example of a radar system including a system to compensate for radar platform angular motion in accordance with an embodiment of the present invention.

FIG. 4A is a block diagram of an example of a radar system 400 that includes a system 401 to compensate for radar platform angular motion in accordance with other embodiments of the present invention. Either of the method 200 and 300 of FIGS. 2 and 3, respectively, may be embodied in the system 400. The system 400 may include a phased array radar 402 to transmit radar beams or signals 404 and to receive return beams or beam responses 406. The phased array radar 402 may be partitioned into four quadrants, labeled A, B, C and D in FIG. 4, and may have corresponding quadrant outputs 408a, 408b, 408c and 408d for each array subsection or quadrant response. While the present invention is described with respect to the exemplary phased array radar 402 being partitioned in four quadrants, the present invention may be applicable to arrays partitioned in any number of subsections.

The system 400 may include an RF receiver 410 to receive the beam quadrant or subsection responses on the outputs 408. The RF receiver 410 may convert the RF signals to intermediate or baseband signals. An intermediate frequency processor (IFP) 412 may be provided to perform any processing or cleaning-up of the intermediate or baseband beam response signals for further processing. The IFP 412 may include range gates to limit the subsection beam responses and to correct for any gain variations or other anomalies.

An in phase and quadrature (I & Q) analog-to-digital converter (ADC) 414 may receive the processed beam response signals from the IFP 412. The I & Q ADC 414 may digitally sample the response signals to form complex digital representations of the respective subsection or quadrant beam responses to facilitate applying phase adjustments to the beam responses by means of a complex multiply function to substantially decouple the responses from any platform angular motion. The complex digital representations or responses are also required to form the monopulse Sum and Delta beams responses, and for optimal narrow band filtering. The complex digital responses can also be used to apply frequency shifting for purposes of downconversion or for optimal positioning of the target frequency.

A processor 416 may receive the digital response signals from the I & Q ADC 414. The processor 416 may apply a complex multiply module 418 or operation to each digital quadrant response to substantially decouple each response from any platform angular motion. Each complex multiply module 418 may apply a phase shift to each response in response to calibration adjustments 420 and platform angular motion adjustments 422.

The platform angular motion adjustments 422 may be derived from signals from a platform angular motion sensor 424 or estimator and a beam steering controller 426. The platform angular motion sensor 424 or estimator may be an inertial measurement unit (IMU) or the like. The beam steering controller 426 may be similar to beam steering controller 132 in FIG. 1 and may perform similar functions. A digital processor 428 may convert or condition the calibration adjustments 420 and platform angular motion adjustments 422 in a digital format that can be easily applied to each of the response signals by the respective complex multiply modules 418. The calibration adjustments 420 may be determined as previously described with respect to block 314 in FIG. 3.

The resulting adjusted or compensated responses from complex multiply modules 418 may be filtered by a Fast Fourier Transform filtering module 430 or the like to form narrow band Doppler filtered bin outputs 432. The system 400 may also include a module 434 or data structures to generate Sum and Delta beams and to compute monopulse boresight error signals. Compensating for the radar platform angular motion may provide benefits or results such as minimizing radar tracking errors, reducing antenna loses due to platform angular motion, reducing Doppler spreading as well as other possible benefits.

Figure 4B:
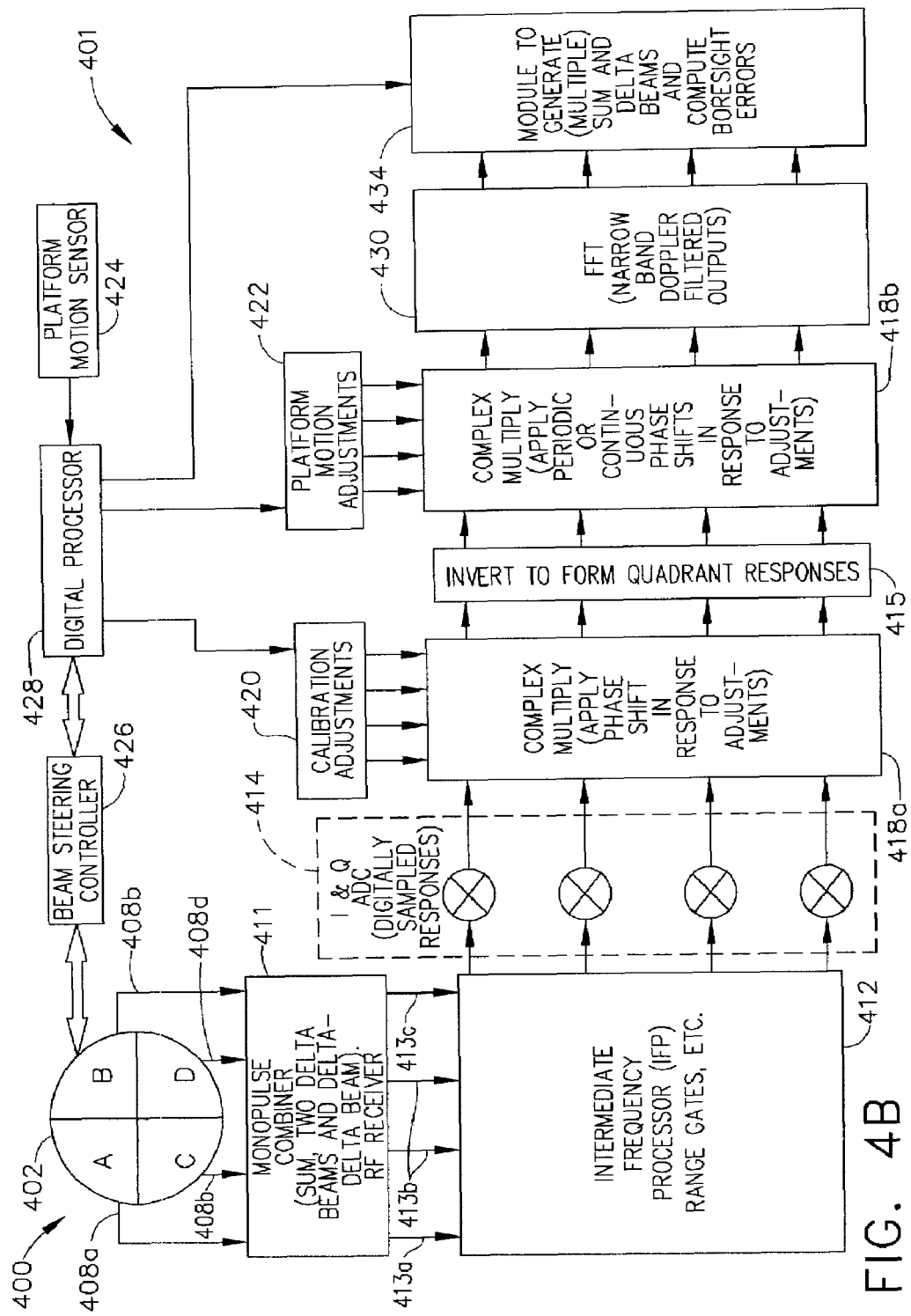
FIG. 4B is a block diagram of an example of a radar system including a system to compensate for radar platform angular motion in accordance with another embodiment of the present invention.

FIG. 4B is a block diagram of an example of a radar system 400' including a system 401' to compensate for radar platform angular motion in accordance with another embodiment of the present invention. The system 400' may be similar to the system 400 of FIG. 4A and may include many of the same elements which are represented by the same reference numerals in FIG. 4B. In the system 400', an RF monopulse combining device 411 may generate at least four RF outputs 413 which may include the Sum beam 413a, two Delta beams 413b (for elevation and azimuth monopulse measurements) and a Delta-Delta beam response 413c. The Delta-Delta beam response 413c is the difference between the Sums of the diagonally opposite quadrants. These four response signals 413 may be coherently combined at any point in the subsequent processing, such as is shown in FIG. 4B at reference numeral 415, to provide four individual quadrant responses, as described in the equations below. Phase compensation may then be applied to the derived quadrant responses to provide platform angular motion decoupled responses that can be applied similar to that described with reference to FIG. 4A to generate the Sum and Delta beam responses. It will be noted that the compensation is only effective when applied to spatially distinct subsections of the response, so that application to the monopulse returns that emanate from the entire array would be ineffective. This embodiment is appropriate to systems that are configured to generate RF monopulse outputs.

The quadrant responses are represented by $X_A$, $X_B$, $X_C$, and $X_D$ and the monopulse outputs by S, Az, El, and DD:

$$S = X_A + X_B + X_C + X_D$$

$$Az = X_A - X_B + X_C - X_D$$

$$EL = X_A + X_B - X_C - X_D$$

$$DD = X_A - X_B - X_C + X_D$$

Representing the coherently processed monopulse signals with the same notation, the corresponding quadrant responses can be regenerated by inverting the above linear equations giving:

$$X_A = \frac{S + Az + EL + DD}{4}$$

$$X_B = \frac{S - Az + EL - DD}{4}$$

$$X_C = \frac{S + Az + EL - DD}{4}$$

$$X_D = \frac{S - Az - EL + DD}{4}$$

FIG. 5 is a block diagram of an example of a system 500 to compensate for radar platform angular motion in a transmitted radar beam in accordance with an embodiment of the present invention in order to maximize transmit beam gain and minimize Doppler spreading of the target illumination signal. The system 500 may include the same or similar elements as those in system 400 to compensate for platform angular motion in the received radar signals or responses. Accordingly, the system 500 may include a platform angular motion sensor or estimator 502 to sense any radar platform angular motion and a beam steering controller 504 to control orientation and other characteristics of the radar beam. The signals from the platform angular motion sensor 502 and beam steering controller 504 may be converted or conditioned in a digital processor 506 to form platform angular motion adjustments 508. Calibration adjustments are not normally used for the transmit beam formation since the primary calibration function is for controlling monopulse null stability that is not applicable to the transmit sum beam.

Each of a plurality of complex multiply modules 512 may respectively apply a sampled time varying phase shift to each quadrant or subsection beam input signal 514 in response to the adjustments 508 and 510 to compensate each input signal 514 for any radar platform angular motion or to substantially decouple the input signals 514 from any platform angular motion. The respective beam input signals 514 may be generated by a digital signal generator 516 or other circuitry.

The compensated input beam signals for each quadrant or subsection may be converted by a digital to analog converter 518. The beam signals may then be feed to an RF transmitter 520 and then transmitted by respective quadrants of a radar antenna array 524. The beam steering controller 504 may be coupled to the processor 506 and to the radar antenna array 524 to control the phase adjustments of the individual elements and to receive feedback as may be needed.

Figure 6:
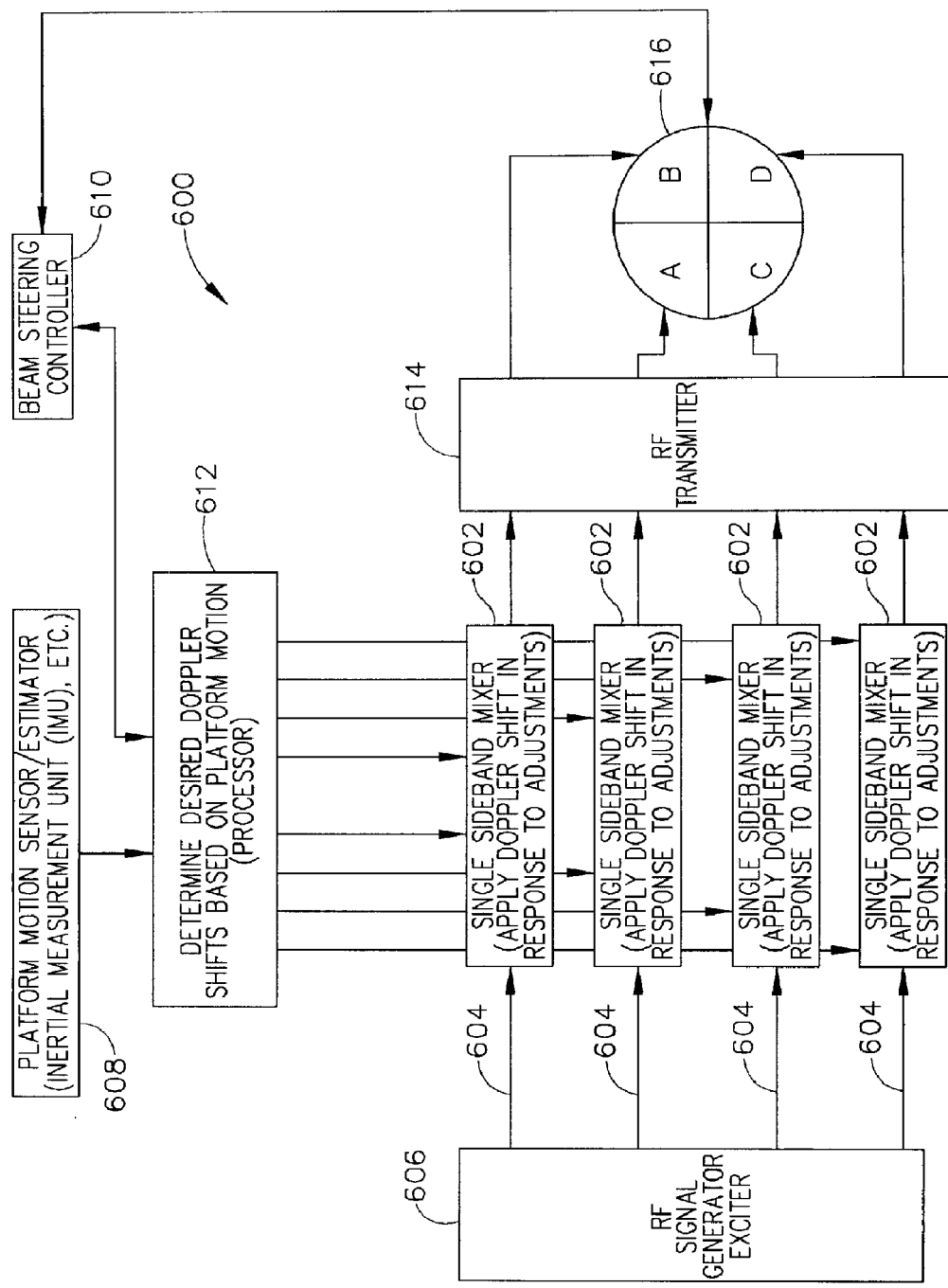
FIG. 6 is a block diagram of an example of a system to compensate for radar platform angular motion in a transmitted radar beam in accordance with another embodiment of the present invention.

FIG. 6 is a block diagram of an example of a system 600 to compensate for radar platform angular motion in a transmitted radar beam in accordance with another embodiment of the present invention. The system 600 may be similar to the system 500 but system 600 may be characterized as providing an analog solution while the system 600 may be characterized as providing a digital solution. Single side band mixers 602 may be used to a apply a respective Doppler shift to each RF subsection input signal 604 from an RF signal generator or exciter 606 to compensate for platform angular motion. Doppler shift and the time varying phase shift compensations are the same. Doppler shift may be used in reference to removing Doppler spreading of signals. The system 600 may include a platform angular motion sensor 608 and beam steering controller 610 similar to platform angular motion sensor 502 and beam steering controller 504 of system 500 in FIG. 5. The signals from the platform angular motion sensor 608 and beam steering controller 610 may be applied to a unit 612 to determine desired Doppler shifts based on platform angular motion. The unit 612 may be a data structure operable on a processor or the like. The single sideband mixers 602 may then apply the Doppler shifts to the respective input signals 604. An RF transmitter 614 may then feed the platform angular motion adjusted or motion compensated beam input signals to the respective quadrants or subsections of a radar antenna array 616 for transmission. The beam steering controller 610 may be coupled to the processor 612 and to the radar antenna array 616 to control the phase adjustments of the individual elements and to receive feedback as may be needed.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method to compensate for radar platform angular motion, comprising:
performing one of sensing, measuring and estimating radar platform angular motion, wherein angular motion includes at least one of a roll, pitch or yaw motion;
determining time varying phase adjustments in response to any radar platform angular motion; and
compensating each array subsection response of a plurality of array subsection responses for any radar platform angular motion by applying continuous time varying phase adjustments to each individual array subsection response, wherein compensating each array subsection response comprises translating one of an original coordinate orientation of a beam pointing direction and a measured target orientation to a new coordinate orientation in response to any radar platform angular motion during a coherent processing interval.

2. The method of claim 1, wherein compensating each array subsection response comprises transforming any radar platform angular motion onto one of a beam pointing direction and a measured target orientation.

3. The method of claim 1, further comprising continuously correcting each subsection response for relative phase changes induced by any radar platform angular motion to perform at least one of:
minimizing angular tracking errors;
reducing antenna loses caused by platform angular motion during a coherent processing interval;
reducing antenna beamwidth spreading caused by platform angular motion; and
removing Doppler spreading on received return signals caused by differential relative Doppler shifts between individual array subsection responses.

4. The method of claim 1, further comprising:
filtering each array subsection response to provide a narrow band Doppler filtered bin output; and one of
applying limiting to each array subsection response to substantially eliminate any effects of channel gain variations; and
applying limiting to each array subsection response prior to filtering for a system utilizing a carrier frequency that is high relative to a bandwidth of each array subsection response at a point where the limiting is applied.

5. The method of claim 1, further comprising applying fast Fourier transform filtering to each phase adjusted subsection response to provide a narrow band Doppler filtered bin output.

6. The method of claim 5, further comprising forming a plurality of deep tracking nulls for placement on any unwanted targets and any sources of jamming signals and to minimize interference associated with a target angular position measurement.

7. The method of claim 1, further comprising applying compensation to a transmit radar beam in response to any platform angular motion to maximize effective antenna gain on a target and minimize Doppler spreading of signals illuminating the target.

8. A method to compensate for radar platform angular motion, comprising:
performing one of sensing, measuring and estimating any radar platform angular motion, wherein angular motion includes at least one of a roll, pitch or yaw motion;
determining time varying phase adjustments in response to any radar platform angular motion;
compensating each array subsection response of a plurality of array subsection responses for any radar platform angular motion by applying continuous time varying phase adjustments to each individual array subsection response; and
applying angular motion compensation prior to forming a multiplicity of beams and nulls to track multiple targets.

9. The method of claim 8, further comprising phase shifting each compensated array subsection response in relative phase based on any platform angular motion prior to forming filtered Sum and Delta beam responses to provide the multiplicity of monopulse nulls.

10. A method to compensate for radar platform angular motion, comprising:
performing one of sensing, measuring and estimating any radar platform angular motion, wherein angular motion includes at least one of a roll, pitch or yaw motion;
determining time varying phase adjustments in response to any radar platform angular motion;
compensating each array subsection response of a plurality of array subsection responses for any radar platform angular motion by applying continuous time varying phase adjustments to each individual array subsection response; and
generating Sum and Delta beam responses with any platform angular motion effects being effectively removed.

11. A method to compensate for radar platform angular motion, comprising:
receiving a radar beam response at a phased array antenna including a plurality of subsections, each providing a subsection beam response;
digitally sampling each subsection beam response;
applying a phase shift to each subsection beam response based on any radar platform angular motion, wherein angular motion includes at least one of a roll, pitch or yaw motion; and
compensating a monopulse angle measurement for radar platform angular motion during a coherent processing interval.

12. The method of claim 11, further comprising one of sensing, measuring and estimating a radar platform angular motion during one of a dwell time and a coherent processing interval.

13. The method of claim 11, further comprising applying a calibration phase adjustment between subsection beam responses to correct for any phase differences between the subsection beam responses caused by any of:
down-converting each subsection beam response from a radio frequency signal to an intermediate frequency signal;
applying range gates to the subsection beam responses;
intermediate frequency processing of the subsection beam responses; and
analog to digital conversion of the subsection beam responses.

14. The method of claim 11, further comprising filtering each subsection beam response to provide a plurality of narrow band Doppler filtered bin outputs.

15. The method of claim 14, further comprising forming different beam null orientations from any Doppler bin by applying different phase adjustments to individual subsection beam responses prior to determining Sum and Delta beam responses.

16. A method to compensate for radar platform angular motion, comprising:
 receiving a radar beam response at a phased array antenna including a plurality of subsections, each providing a subsection beam response;
 digitally sampling each subsection beam response;
 applying a phase shift to each subsection beam response based on an radar platform angular motion, wherein angular motion includes at least one of a roll, pitch or yaw motion; and
 determining Sum and Delta beam responses with platform angular motion effects being substantially removed.

17. The method of claim 16, further comprising avoiding smearing loss and Doppler spreading associated with any platform angular motion.

18. The method of claim 17, further comprising applying a different relative phase shift to each subsection input to a phased array transmit beam to avoid the smearing loss and the Doppler spreading.

19. The method of claim 18, further comprising applying a selected differential Doppler shift to each radio frequency subsection input using a single sideband mixer.

20. A radar system, comprising:
 a sensor to sense angular motion of a radar platform, wherein angular motion is at least one of a roll, pitch or yaw motion;
 a module to compensate each array subsection response of a plurality of array subsection responses for any sensed radar platform angular motion by applying continuous time varying phase adjustments to each individual array subsection response; and
 a module to determine the time varying phase adjustments in response to any sensed radar platform angular motion; and
 a module to translate an original coordinate orientation of one of the beam pointing direction and a measured target orientation to a new coordinate orientation in response to any sensed radar platform angular motion during a coherent processing interval to compensate each array subsection response for any radar platform angular motion.

21. The system of claim 20, further comprising a digital processor to generate platform angular motion adjustments.

22. The system of claim 20, further comprising an analog to digital converter to digitally sample each array subsection response.

23. The system of claim 20, further comprising a filter to filter each array subsection response to provide a narrow band Doppler filtered bin output.

24. The system of claim 20, further comprising a fast Fourier transform filter to filter each phase adjusted array subsection response to provide a narrow band Doppler filtered bin output.

25. The system of claim 20, further comprising a module to apply compensation to each transmit array subsection in response to any sensed platform angular motion.

26. The system of claim 20, a single sideband mixer to apply a selected differential Doppler shift to each radio frequency subsection input.

27. A radar system, comprising:
 a sensor to sense angular motion of a radar platform, wherein angular motion is at least one of a roll, pitch or yaw motion;
 a module to compensate each array subsection response of a plurality of array subsection responses for any sensed radar platform angular motion by applying continuous time varying phase adjustments to each individual array subsection response;
 a module to determine the time varying phase adjustments in response to any sensed radar platform angular motion;
 an analog to digital converter to digitally sample each array subsection response; and
 a plurality of complex multiplication modules, each module for applying a phase shift to each digitally sampled array subsection response based on any platform angular motion adjustments relative to the array subsection response.

28. A radar system, comprising:
 a sensor to sense angular motion of a radar platform, wherein angular motion is at least one of a roll, pitch or yaw motion;
 a module to compensate each array subsection response of a plurality of array subsection responses for any sensed radar platform angular motion by applying continuous time varying phase adjustments to each individual array subsection response;
 a module to determine the time varying phase adjustments in response to any sensed radar platform angular motion; and
 a module to generate Sum and Delta beam responses with platform angular motion effects being substantially removed.

29. The system of claim 28, further comprising a module to form a plurality of deep tracking nulls for placement on any unwanted targets and any sources of jamming signals and to minimize interference associated with a target angular position measurement.

30. A computer program product to compensate for radar platform angular motion, the computer program product comprising:
 a computer usable medium having computer usable program code embodied therein, the computer usable medium comprising:
  computer usable program code configured to compensate each array subsection response of a plurality of array subsection responses from any sensed radar platform angular motion by applying continuous time varying phase adjustments to each individual array subsection response, wherein angular motion includes any roll, pitch and yaw motion;
  computer usable program code configured to determine the time varying phase adjustments in response to any radar platform angular motion; and
  computer usable program code configured to generate Sum and Delta beam responses with platform angular motion effects being effectively removed.

31. The computer program product of claim 30, further comprising computer usable program code configured to transform any radar platform angular motion onto one of a beam pointing direction and a measured target orientation.

32. The computer program product of claim 30, further comprising computer usable program code configured to continuously correct for relative phase changes induced by any radar platform angular motion to perform at least one of:
 minimizing radar tracking errors;

reducing antenna loses caused by platform angular motion during a coherent processing interval;

reducing antenna beamwidth spreading caused by platform angular motion; and removing Doppler spreading on received return signals caused by differential relative Doppler shifts between individual array subsection responses.

33. The computer program product of claim 30, further comprising computer usable program code configured to provide a multiplicity of monopulse nulls within a beam width of the array subsection responses to track multiple targets.

34. The computer program product of claim 30, further comprising computer usable program code configured to filter each array subsection response to provide a narrow band Doppler filtered bin output.

35. The computer program product of claim 30, further comprising computer usable program code configured to applying compensation to a transmit radar beam in response to any platform angular motion to minimize spreading and losses in any target illumination.

* * * * *

UNITED STATES PATENT AND TRADEMARK OFFICE
CERTIFICATE OF CORRECTION

PATENT NO. : 7,522,097 B2  Page 1 of 1
APPLICATION NO. : 11/164873
DATED : April 21, 2009
INVENTOR(S) : David R. Wakeman It is certified that error appears in the above-identified patent and that said Letters Patent is hereby corrected as shown below:

Column 17, line 63, please delete "any"

Column 18, line 16, please delete "any"

Column 18, line 36, please delete "any"

Column 19, line 8, please delete "an"

Signed and Sealed this

Second Day of June, 2009

JOHN DOLL
*Acting Director of the United States Patent and Trademark Office*